Sept. 21, 1971
SHIRO TERAI ET AL  3,606,672
METHOD OF MANUFACTURING A CLAD PLATE OF
ALUMINUM AND OTHER METALS
Filed May 7, 1968
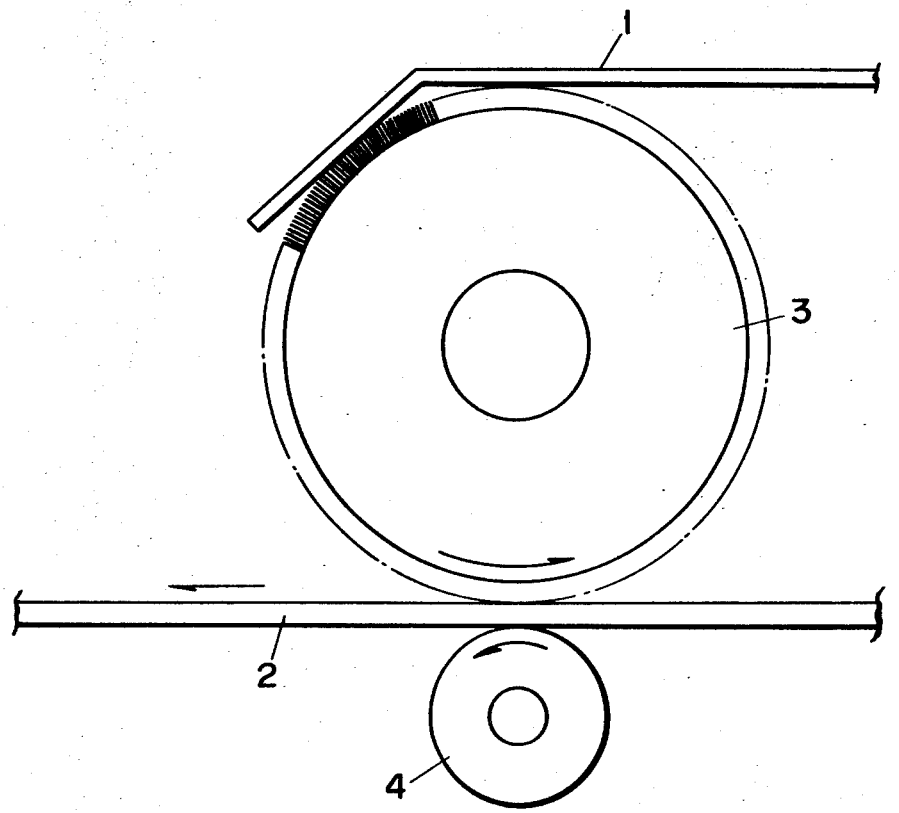
INVENTORS.
SHIRO TERAI
BY MICHIKI HAGIWARA
Barthel & Bugbee
ATTORNEYS United States Patent Office 3,606,672
Patented Sept. 21, 1971

3,606,672
METHOD OF MANUFACTURING A CLAD PLATE OF ALUMINUM AND OTHER METALS
Shiro Terai and Michiki Hagiwara, Nagoya-shi, Japan, assignors to Sumitomo Light Metal Industries Limited, Tokyo, Japan
Filed May 7, 1968, Ser. No. 727,153
Claims priority, application Japan, May 15, 1967, 42/30,748
Int. Cl. B23k 1/20, 31/02
U.S. Cl. 29—488                                3 Claims

ABSTRACT OF THE DISCLOSURE

This disclosure relates to a method of manufacturing a composite metal plate of aluminum and clad with a dissimilar metal in which an enhanced affinity between the two metals thus combined is obtained, and wherein one of the two component metal plates which is harder than the other is roughened on its surface, and particles of the other metal which is softer than the harder metal are blown against the roughened surface of the harder metal plate, and thereafter the softer metal plate which is of the same material as the blown metal particles is laid on and laminated with the surface of the former metal plate and the thus combined metals are then subjected to hot rolling at a temperature of 400° to 450° C.

---

This invention relates to a method of manufacturing a clad plate of aluminum and another metal such as copper, zinc, titanium, and stainless steel.

Hitherto, various methods of manufacturing clad plates of metals have been known. For example, one of said methods comprises producing a compound ingot of two kinds of metal, and thereafter subjecting it to a rolling process to roll it into a composite plate. According to the above method, it is recognized that an intermediate alloy layer is created between the two kinds of metal plates to be clad, an essential component of which layer being $CuAl_2$ in case of aluminum plate and copper plate, and $FeAl_3$ in case of aluminum plate and stainless steel plate. Such intermediate layers are brittle and hard so that the two component plates of said clad plate will be readily exfoliated from each other in the subsequent rolling process, and therefore the industrial production of a satisfactory product will be very difficult.

Methods of cladding the two plates of metal by means either of explosive pressure or of frictional resistance have also been known. These methods, however, have been successful in cladding the two plates in only a small area. Moreover it is difficult to satisfactorily unite the two plates over a large area. Furthermore, such methods require the complicated installation of complicated equipment with the result that they are not suitable for quantity production of clad plates.

A method of pressure welding employing hot or cold rolling is most desirable from the point of view of quantity production and economic industrial facilities. In this method, in order to have an affinity between the aluminum and the foreign metal, a plate of a third metal which cannot create the brittle and hard intermediate layer above mentioned between the two plates is often employed between them during the course of rolling.

However, such an intermediate metal as is required in the last-mentioned method cannot be found in the case of manufacturing a clad plate of aluminum and copper or of aluminum and stainless steel. Furthermore, if such a suitable metal existed and were employed, the number of rolling processes required would be increased, and consequently a clad plate manufactured in this way would result in a high cost of production.

Another method heretofore practiced made use of cold pressure welding employing a special rolling mill such as a sendzimir rolling mill or a planetary rolling mill in order to produce temporarily the high rate of reduction in the course of welding, but in this method, it is difficult to obtain the production of wide plates, because the excessive pressure required on the roll cannot be satisfactorily produced.

Therefore, an object of this invention is to avoid the various faults aforesaid, and to provide improvements in the method of pressure welding in the hot rolling of metals. This invention concerns a method for industrial production of a clad plate composed of aluminum and another metal with satisfactory cohesion, particularly a plate of great width in large quantities in a most simple and reliable manner.

According to this invention, the method for manufacturing a clad plate of aluminum and another metal in a layer form is characterized in that one of the two component metal plates which is harder than the other is roughened on its surface, and particles of the other metal which is softer than the harder metal plate are blown against the roughened surface of the harder metal plate, said particles being crushed and cohered thereon, and thereafter the softer metal plate which is the same in material as the blown metal particles is laid on and laminated with the surface of the harder metal plate, and then the clad metal plate thus produced is subjected to hot rolling at a temperature of 400° to 450° C.

In the preferred embodiments according to the invention, for example, in case of the manufacture of a clad plate of aluminum and copper or aluminum and stainless steel, aluminum particles are blown against the copper or stainless steel plate, and in case of the manufacture of a clad plate of aluminum and zinc, zinc particles are blown against the aluminum plate, and thereafter the aluminum plate (in the former case) or the zinc plate (in the latter case) is laid on the other plate, and the thus laminated plates are together subjected to hot rolling at a temperature of 400° to 450° C. Thus a clad plate is manufactured in the course of pressure welding combined with hot welding.

One embodiment of this invention will be now described in detail as a non-limiting example with reference to the accompanying sole drawing.

Particularly, the drawing shows diagrammatically an example of a device adapted to cause aluminum particles to cohere on a copper plate.

In the figure, the numeral 1 shows a body composed of aluminum material from which aluminum particles are obtained. The numeral 2 shows a copper plate to be cladded. The numeral 3 shows a rotatory wire brush, and the numeral 4 shows a roller on which the copper plate is moved. In operation, said rotatory wire brush is held under pressure between the aluminum material and the copper plate which can be moved forwardly and rearwardly by the roller.

Upon rotating the wire brush 3, the aluminum body 1 of material which is less hard than the copper plate 2 is scraped off successively by the pointed ends of the brush and the aluminum particles thereby created disperse, while the copper plate 2 which is harder than the aluminum material 1 is roughened on its surface by the same brush 3. Under these circumstances, temperatures of the surfaces of the aluminum material 1 and the copper plate 2 may rise to approximately 100° C. by the rubbing together of the wire brush 3 and said surfaces.

The aluminum plate to be joined to the aluminum-particle-coated copper plate is then placed against the thus coated surface of the copper plate and this assembly subjected to hot rolling at a temperature of 400° to 450° C. The resulting product consisting of this composite aluminum-and-copper plate has an extremely good cohesion, not being easily peeled off by contact bending at an angle of 180°.

The temperature during hot rolling may be in the range of 400° to 450° C., because if it is below 400° C. cohesion will not be obtained sufficiently, and if it is above 450° C. the aluminum will lose its resistance for deformation and subsequent rolling will be difficult. The time required for maintaining the material at such a temperature may be possibly shortened and the material may preferably be rolled immediately after it reaches such a temperature.

Another embodiment according to this invention will be now described, in which 0.9 mm. thick aluminum plate and 0.1 mm. thick stainless steel plate may be used.

The aluminum plate may be dipped in a 0.7% caustic soda solution for about 20 seconds at a temperature of 50° C., neutralized with nitric acid, and thereafter fully washed and dried. Subsequently, the surface (one or both surfaces) of the aluminum plate to be clad with the stainless steel may be brushed with a wire brush so as to have a well roughened surface. The stainless steel may be then washed and cleaned with aqua regia (in the ratio of nitric acid 1; hydrochloric 3; and fluoric acid 0.1 by volume). After washing and drying, the surface of the stainless steel to be clad with the aluminum plate may be roughened and coated with aluminum particles by the method above described and shown in the drawing.

The aluminum particle-coated stainless steel plate obtained in such a way is laid upon the aforementioned aluminum plate and these plates thus placed together are then subjected to hot rolling at a rate of thickness reduction of 30% at a temperature of 400° to 450° C.

Cohesion of the stainless-steel-clad aluminum plates quite characteristic in that no peeling off nor cracking can be produced in the plate by contact bending at an angle of 180°. If the rate of thickness reduction exceeds 50% for the clad plate of aluminum and stainless steel, cracking would occur in the stainless steel so that it is preferred to keep the rate of thickness reduction not exceeding the last-mentioned percentage.

The method described above with reference to the cladding of aluminum plate with copper plate and of aluminum plate with stainless steel plate will apply to the case of cladding of aluminum plate with zinc plate or aluminum plate with titanium plate, in any case of which there may be obtained a metal-clad aluminum plate of higher cohesion than with the above-mentioned prior art methods.

Furthermore, a repeated application of the same procedure according to this invention will facilitate the manufacture of multi-layer dissimilar-metal-clad aluminum plate quite satisfactorily.

As can be seen in the above description, the method of this invention makes it possible to produce a clad plate of aluminum and another metal and obtain the highest cohesion. Particularly, the present method is suitable for easy production of a dissimilar-metal-clad aluminum plate of large width for industrial use.

What we claim is:

1. A method of manufacturing a clad plate of aluminum and a metal dissimilar thereto, characterized in that one surface of said dissimilar metal plate is abraded and roughened by a wire brush while being pelted with particles of aluminum which are simultaneously embedded in said one surface into close adherence therewith by said wire brush without the application of external heat to said particles during said pelting; is further characterized by removing the oxide film from a surface of an aluminum plate and by roughening said aluminum plate surface by a wire brush; and is finally characterized by bringing the oxide-free roughened surface of said aluminum plate into engagement with the aluminum-particle-embedded surface of said dissimilar metal plate and by subjecting the thus-engaged metal plates to hot rolling at a temperature of 400° C. to 450° C.

2. A method of manufacturing a clad plate of aluminum and a metal dissimilar thereto, characterized in that one surface of said dissimilar metal plate is abraded and roughened by a wire brush while being pelted with particles of aluminum which are simultaneously embedded in said one surface into close adherence therewith by said wire brush; is also characterized in that the particles of aluminium with which said dissimilar metal plate is pelted are simultaneously dislodged and ejected at high speeds from an aluminum body held under pressure against said wire brush while said wire brush is rotated and held under pressure against said dissimilar metal plate surface; is further characterized by removing the oxide film from a surface of an aluminum plate and by roughening said aluminum plate surface by a wire brush; and is finally characterized by bringing the oxide-free roughened surface of said aluminum plate into engagement with the aluminum-particle-embedded surface of said dissimilar metal plate and by subjecting the thus-engaged metal plates to hot rolling at a temperature of 400° C. to 450° C.

3. A method, according to claim 5, characterized in that the metal of said dissimilar metal plate of said clad plate is selected from the group consisting of copper, titanium, zinc, and stainless steel.

References Cited

UNITED STATES PATENTS

| | | | |
|---|---|---|---|
| 2,782,498 | 2/1957 | Mushovic et al. | 29—497.5 |
| 3,210,840 | 10/1965 | Ulam | 29—497.5X |
| 3,292,256 | 12/1966 | Morgan | 29—497.5 |
| 3,381,366 | 5/1968 | Winter | 29—497.5X |
| 3,400,450 | 9/1968 | Nock, Jr., et al. | 29—497.5 |
| 706,701 | 8/1902 | Thurston | 117—Friction Dig. |
| 822,873 | 6/1906 | Thurston | 117—Friction Dig. |
| 1,460,137 | 6/1923 | Myers | 117—Friction Dig. |
| 1,726,340 | 8/1929 | Buttles | 117—Friction Dig. |
| 2,075,518 | 3/1937 | Gettelman | 117—Friction Dig. |
| 3,046,640 | 7/1962 | Singleton, Jr. | 29—498X |
| 3,173,202 | 3/1965 | Farber | 29—498X |
| 3,210,840 | 10/1965 | Ulam | 29—498X |

JOHN F. CAMPBELL, Primary Examiner

R. J. SHORE, Assistant Examiner

U.S. Cl. X.R.

29—497.5, 498